Oct. 16, 1962 E. E. BIANCO ETAL 3,059,043
FLUID DUCT FOR ELECTRICAL APPARATUS
Filed Nov. 18, 1959 3 Sheets-Sheet 1

Inventors,
Ernest E. Bianco,
Frederick W. Zieba,
by Gilbert P. Tarlton
Their Attorney.

Oct. 16, 1962   E. E. BIANCO ETAL   3,059,043
FLUID DUCT FOR ELECTRICAL APPARATUS
Filed Nov. 18, 1959   3 Sheets-Sheet 2
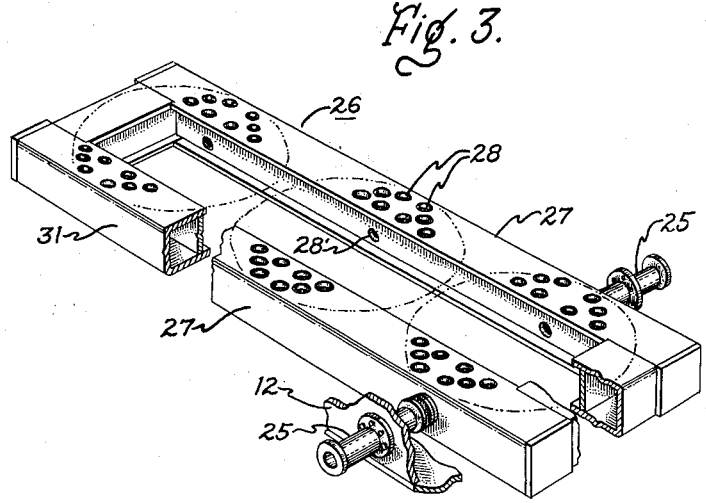
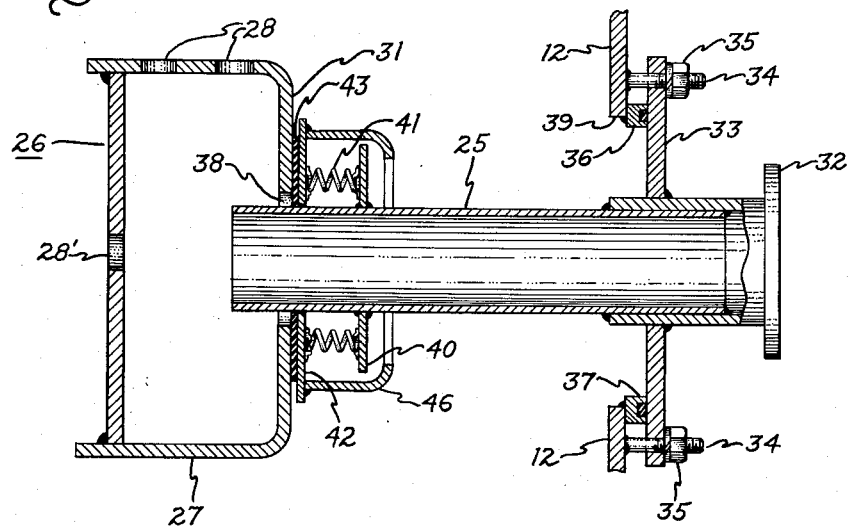
Inventors,
Ernest E. Bianco,
Frederick W. Zieba,
by Gilbert P. Tarleton
Their Attorney.

Inventors,
Ernest E Bianco,
Frederick W. Zieba,
by
Their Attorney.

United States Patent Office 3,059,043
Patented Oct. 16, 1962

3,059,043
FLUID DUCT FOR ELECTRICAL APPARATUS
Ernest E. Bianco, North Adams, and Frederick W. Zieba, Adams, Mass., assignors to General Electric Company, a corporation of New York
Filed Nov. 18, 1959, Ser. No. 853,895
8 Claims. (Cl. 174—16)

This invention relates to electrical apparatus and more particularly to an improved duct and gasket means for facilitating the entry of a heat absorbing fluid into such apparatus.

It is fundamental that electrical apparatus generate heat in proportion to the current that passes through them. Electrical induction apparatus, and in particular transformers, conventionally have a large electric current passing through conductors of considerable length. Consequently, induction apparatus generate considerable heat and thus present difficult problems on how to keep the apparatus cool under operating conditions. We have, therefore, chosen electrical induction apparatus, and particularly transformers, as a typical example of apparatus to which our invention can be applied.

For many years, transformers have been cooled by passing a heat absorbing fluid, such as transformer oil, around them in an enclosed tank, and then circulating the fluid through radiators or other heat transfer means externally affixed to the tank for dissipating the heat absorbed from the transformer. Recently, outstanding progress has been made in the field of fluid-circulating transformer cooling systems by the provision of internal and external plenum chambers in the fluid circulating system and the use of innovations which permit standardized interchangeable external cooling units to be selectively applied to the transformer as dictated by the kva. load it must carry. Disclosure of a cooling arrangement embodying the above innovations can be found in the application of N. E. Dillow et al., Serial No. 852,301, filed November 12, 1959, and assigned to the assignee of the present invention. In the embodiment of our invention illustrated in this application, our improved fluid entry duct and gasket arrangement have been illustrated as being applied to a cooling system of the type disclosed in the above mentioned Dillow et al. application. In such a cooling system the transformer is housed in an enclosure tank that is filled with a heat absorbing fluid, such as transformer oil. An internal fluid conveying member or plenum chamber may be provided beneath the transformer for circulating the fluid upwardly through apertures in its core and winding. The internal plenum chamber may be connected to external heat transfer units by means of a fluid entry duct that passes through a side panel of the enclosure tank and then enters an opening in a wall of the internal plenum chamber. Each of these elements should be of predetermined, standardized size, thus permitting the use of production line techniques in the manufacture of large sized commercial transformers.

It is desirable that transformers utilizing internal fluid conveying members be manufactured by first assembling the core and winding on the fluid conveying members, and then lowering the assembly into the enclosure tank. Next, a fluid entry duct is inserted through an opening in the enclosure side panel and then passed into an opening in a wall of the fluid conveying member. Because the two above-mentioned openings may be misaligned slightly, they must be of a large size in relation to the duct in order to permit the duct to pass through both of them. The distance between the enclosure side panel and the member wall cannot be held to close tolerances because of the large over-all size of the apparatus. Since it is necessary that the standard sized fluid entry duct be maintained in fluid sealing relationship with the enclosure side panel and member wall, means must be provided on the duct to insure that fluid sealing contact with the above-mentioned elements would be maintained even though wide variations occurred in their spacing. Also, because of the possibility of a variation in the spacing between the enclosed side panel and fluid conveying member wall during operation of the apparatus as caused by thermal expansion for example, the fluid seal on the duct must be such that it permits relative movement of these elements axially of the duct without breaking the seal.

Several sealing arrangements were tried but found to be impractical or unsatisfactory. These included a fluid duct comprising a flexible, expansible tube or Sylphon-type construction; also, a duct comprising two tubes, one telescoping within the other until the desired length was reached and then the tubes being secured in place relative to each other by means of set screws was tried without success. These arrangements were impractical and expensive to install because the ducts had to be secured from the outside of the enclosure tank at each of their ends to both the enclosure side panel and fluid conveying member wall after the transformer had been lowered into the enclosure tank.

Briefly stated, in accordance with one aspect of our invention, we provide a fluid transmitting duct that extends between an enclosure side panel and a wall of a hollow fluid carrying member, the duct being attached in a fluid sealing manner to the side panel, and having a gasket associated therewith in such a manner that the gasket is resiliently urged into fluid sealing contact with the member wall.

It is, therefore, an object of our invention to provide an improved fluid transmitting duct.

It is also an object of our invention to provide an improved fluid entry system on an electrical apparatus.

A further object of our invention is to provide an improved seal for a duct that permits the duct to remain in fluid sealing relationship with other members in a fluid circuit even though the spacing of said members varies.

An additional object of our invention is to provide a fluid entry system in which a duct extending through elements in the system has a gasket associated therewith that permits the duct to remain in fluid sealing relationship with elements even though the space between them varies.

A still further object of our invention is to provide an improved gasket which seals an opening through which a duct is inserted.

Our invention will be better understood from the following description taken in connection with the accompanying drawings and its scope will be pointed out in the appended claims.

FIGURE 3 is a perspective, partially cross-sectional, view of the internal plenum chamber of the transformer of FIGURES 1 and 2.

FIGURE 4 is a cross-sectional view taken through the plenum chamber and fluid entry duct of FIGURE 3.

Figure 1:
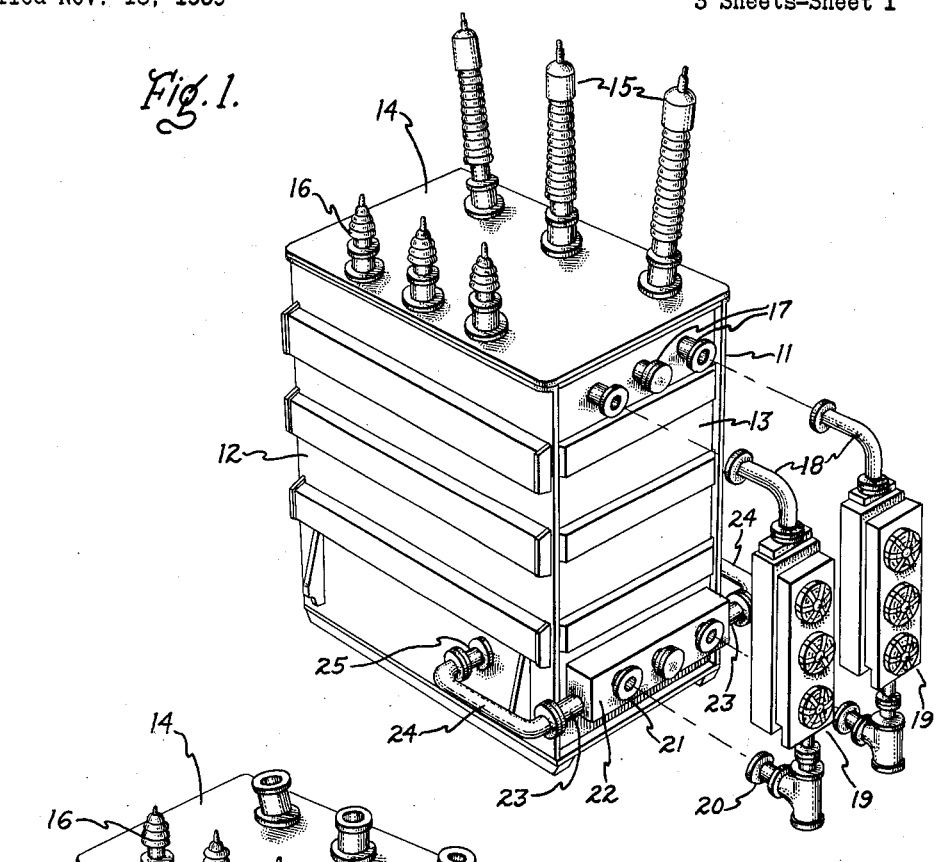
FIGURE 1 is a perspective, partially exploded, view of a transformer of the type to which our invention may be applied.
Figure 2:
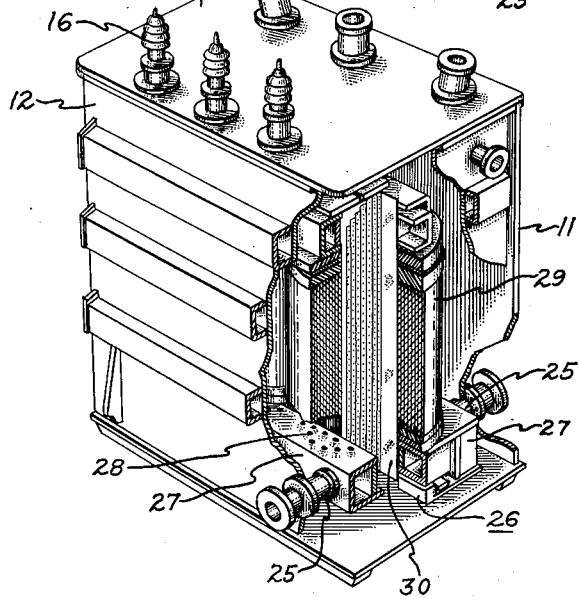
FIGURE 2 is a perspective, partially cross-sectional, view of the transformer of FIGURE 1.

Referring now to the drawings, and more in particular to FIGURES 1-3, therein is illustrated a transformer of the type disclosed and claimed in application No. 852,301, filed November 12, 1959, by N. E. Dillow et al., and assigned to the assignee of this invention. In FIGURE 1, the transformer 10 is seen to comprise an enclosure tank 11 having a side panel 12, an end wall 13, and a top 14. Conventional transformer accessories such as high voltage bushings 15 and low voltage bushings 16, may be attached to the transformer tank according to the usual practice.

The enclosure tank 11 is provided with a plurality of fluid exit ports 17 to which high temperature fluid inlet connections 18 on the external coolers 19 may be attached. It is to be understood, of course, that any type of heat transfer means may be used in place of the cooling units illustrated. Each cooling unit 19 has a low temperature fluid discharge connection 20 which is attached to a fluid entry port 21 on the external plenum chamber 22. The external plenum chamber 22 has a fluid discharge duct 23 which is connected by means of a fluid conduit 24 to a fluid intake duct 25, the fluid intake duct 25 being described in greater detail in paragraphs that follow.

Referring now to FIGURES 2 and 3, the fluid intake duct 25 is seen to extend through the side panel 12 into the interior of tank 11 and to be connected to the internal plenum chamber 26. The internal plenum chamber 26 comprises a pair of elongated hollow tubular members 27 with a plurality of apertures 28 and 28' therein. The apertures 28 are so arranged that they communicate with canals in the transformer winding 29, and the apertures 28' communicate with canals in the core 30, so that a heat absorbing fluid may be caused to flow through the windings and core in the manner described and claimed in the above mentioned application of Dillow et al. The tank 11 may be filled with a heat absorbing fluid, such as transformer oil, which is circulated through the transformer core and windings and then passes out of the fluid exit ports 17 in the upper end of the tank 11. The fluid passes through the cooling units 19, where heat absorbed from the transformer is dissipated, and then into the external plenum chamber 22. From the chamber 22 the fluid flows through the conduits 24, and then through the side panel 12 and into the internal plenum chamber 26 via the intake duct 25.

It will be seen that the side panel 12 is spaced from the outer wall 31 of the elongated member 27, it being understood that exactly the same condition exists on each side of the transformer. In order to insure that the transformer tank 11 does not permit the heat absorbing fluid therein to escape, the duct 25 must cooperate with the panel 12 so as to form a fluid tight seal therewith.

In FIGURE 4, a preferred arrangement for obtaining a fluid tight seal is illustrated, although it will be appreciated that any equivalent fluid sealing arrangement might be used between the side panel 12 and duct 25. The intake duct 25 comprises a flange 32 for connecting same to the conduit 24, and a sealing plate 33 may be secured to the duct 25 adjacent the flange 32. The plate 33 has a plurality of apertures therein through which bolts 34 pass, the bolts being secured to the side panel 12. The duct 25 may be securely held in place by nuts 35 threaded onto the bolts 34. A fluid tight seal between the panel 12 and plate 33 is obtained by means of an annular element 36 in which a flexible gasket 37 is housed. Although the duct 25 has been illustrated as comprising two tubular elements, one of which is telescoped and secured within the other, a duct comprising a single tubular element would be the full equivalent of that illustrated.

In order to obtain a controlled or forced fluid flow through the transformer core and windings, it is necessary that the heat absorbing fluid coming from the external cooling units 19 be passed into the internal plenum chamber 26 without first passing into the tank 11. In assembling the transformer illustrated in this application, the plenum chamber windings and core are first assembled and securely clamped together. This assembly is then lowered into the tank 11 and aligned as far as is practical in apparatus of this large size with all external connections. Because the distance between the wall 31 of the member 27 and the side panel 12 of the enclosure tank 11 is likely to vary over a wide range, small tolerances in this dimension are impossible to maintain. Consequently, it is necessary that a seal be provided on the duct 25 that is capable of sealing the opening 38 over a wide range of spacing because the duct 25 is of a predetermined standardized size. After the transformer assembly has been lowered into the tank 11 and aligned as best as is possible, the duct 25 is passed through a hole 39 in the side panel 12 and then an end portion of the duct 25 is inserted into the opening 38 in the member 27. Because the hole 39 and opening 38 are likely to be slightly out of line when the transformer is assembled, they are made considerably larger than the conduit 25 in order to insure that it will pass through both of them. It should also be noted that the opening 39 is larger than any part attached to the duct 25 in order to permit installation of the duct assembly from the exterior of the tank 11.

The improved means associated with the duct 25 for sealing the aperture 38 comprises an abutment 40 which is attached to the duct. Resilient means, such as springs 41, are attached to the abutment 40, it being understood, of course, that any resilient means may be employed in place of the springs illustrated. The springs 41 are attached to a plate 42, which has an internal diameter essentially the same as the external diameter of the duct 25. A flexible body of gasket material 43 is attached to the plate 42. The interior diameter of the body 43 may be smaller than the exterior diameter of the duct 25 so that the basket material will maintain a fluid tight seal around the duct 25. The plate 42 and body of gasket material 43 are nevertheless movable axially along the duct 25 and are urged away from the abutment 40 by the spring means 41. A corona shield 46 that surrounds the abutment 40 and spring means 41 may be connected to the plate 42; because of its curved surface the corona shield 46 protects sharp corners on these elements from electrical stress. The corona shield is, of course, movable along the duct 25 with the plate 42 and the gasket element 43.

The distance between the plate 33 and the gasket 43 is made more than the maximum distance between the element 36 and the wall 31, thus insuring that the spring means 41 will always be in compression when the apparatus is assembled. The distance between the abutment 40 and gasket 43 is made several times larger than maximum variation in spacing that occurs between the side panel 12 and wall 31. It is thus apparent that the gasket 43 will be urged into fluid sealing contact with the wall 31 around the opening 38 over a wide range of spacings between the side panel 12 and wall 31, the range being more than adequate to be workable at the tolerances encountered in assembling large transformers.

Figure 5:
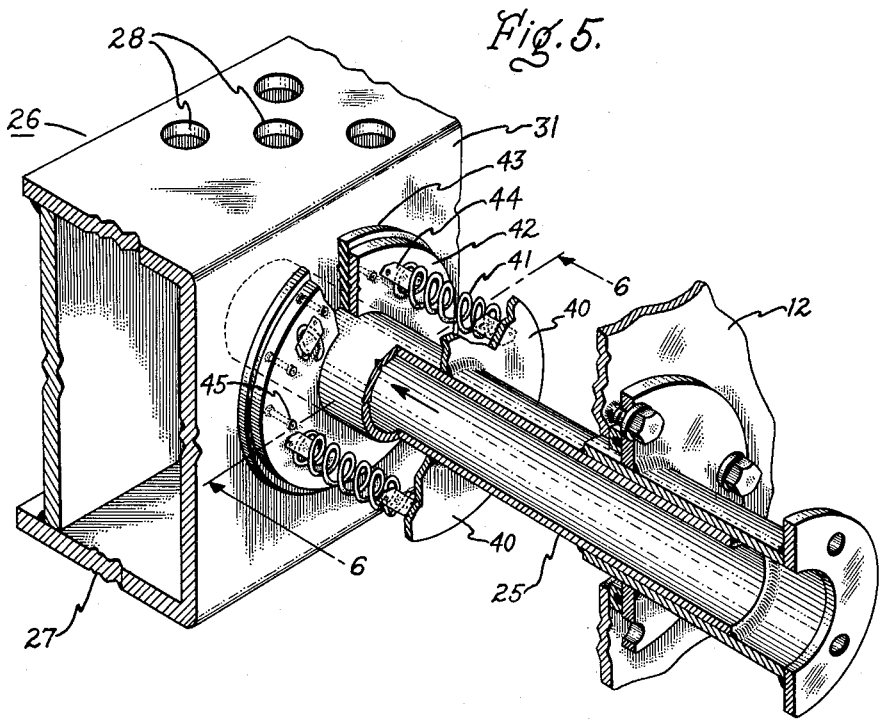
FIGURE 5 is a perspective, partially cross-sectional, view of the duct and plenum chamber shown in FIGURES 3 and 4.
Figure 6:
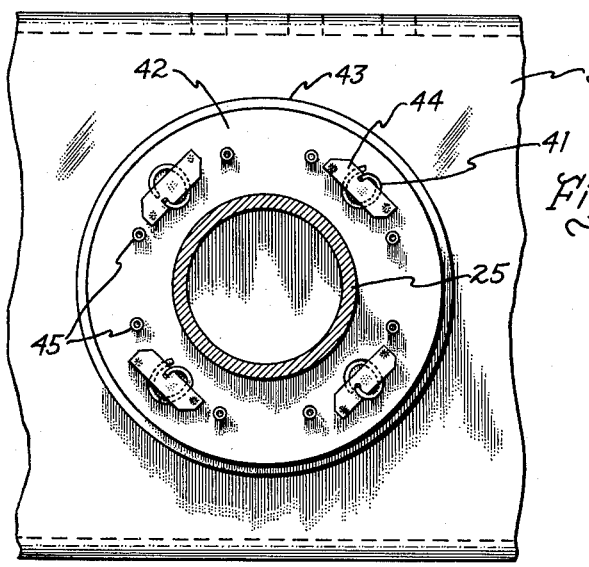
FIGURE 6 is a cross-sectional view taken along the lines 6—6 in FIGURES 5.

In FIGURES 5 and 6, a preferred arrangement for securing the plate 42 and gasket 43 to the abutment 40 is illustrated. The corona shield 46 has been omitted from FIGURES 5 and 6 for the purposes of clarity of the drawing. The spring means 41 may be attached at its ends to the abutment 40 and plate 42 by means of flat strips of metal 44 that are spot welded in place as shown. The gasket 43 may be attached to the plate 42 by means of rivets 45. It will be understood, of course, that any suitable attaching means may be used in place of the spot welded strips 44 and rivets 45 to attach the gasket and plate to the duct 25.

It has thus been shown that the duct and gasket arrangement of our invention provides a unique means for facilitating the entry of a heat absorbing fluid into electrical apparatus. Our arrangement possesses the advantage of allowing assembly of the duct into the internal plenum chamber 26 from the exterior of the enclosure tank, and eliminates the disadvantages inherent in other duct assembly arrangements that require the duct to be fabricated in the exact size required for each individual transformer and then securely attached to the enclosure side panel and plenum chamber member wall. Furthermore, by the use of a gasket that is associated with the duct in such a manner that it is resiliently urged in an axial direction along the duct, a fluid tight seal between the duct and member wall is assured over a wide range of spacings between the side panel and member wall.

It will be understood, of course, that, while the form of the invention herein shown and described constitutes the preferred embodiment of the invention, it is not intended herein to illustrate all of the equivalent forms or ramifications thereof. It will also be understood that the words used are words of description rather than of limitation, and that various changes may be made without departing from the spirit and scope of the invention herein disclosed, and it is aimed in the appended claims to cover all such changes as fall within the true spirit and scope of the invention.

What we claim as new and desire to secure by Letters Patent of the United States is:

1. In combination, a fluid conveying member having an opening in a wall thereof, a panel through which fluid must pass before entering said member, said panel being spaced from said wall and having a hole therein substantially aligned with said opening, a fluid entry duct having an end portion thereof passing through said hole and entering the opening in said wall, said panel and duct having cooperating means that prevent fluid from escaping therebetween through said hole, said duct having an abutment attached thereto between the wall and panel, gasket means surrounding said duct between the abutment and wall, said gasket means being movable axially along said duct, and means connected to said gasket means and abutment resiliently urging said gasket means into fluid sealing contact with said wall around the opening therein.

2. Electrical apparatus comprising a fluid conveying member, having an opening in a wall thereof a panel through which fluid must pass before entering said member, said panel having a hole therethrough and a surface substantially parallel to and spaced from said wall, and a fluid entry duct having means adjacent one end thereof, attaching same to said wall for providing a fluid-tight seal therebetween gasket means surrounding said duct adjacent the other end thereof, said gasket means being movable axially along said duct, means on said duct resiliently urging said gasket means into fluid sealing contact with said wall, and said duct, gasket means, and resilient means being dimensioned to pass through said hole.

3. Electrical apparatus comprising a heat generating current carrying conductor, an enclosure surrounding said conductor, a heat absorbing fluid in said enclosure, means in said enclosure for distributing said fluid around said conductor, heat transfer means having a fluid inlet externally connected to said enclosure, and a duct connecting a fluid outlet on said heat transfer means to the fluid distributing means in said enclosure, gasket means surrounding said duct, means on said duct resiliently urging said gasket means into fluid sealing contact with said fluid distributing means, an abutment attached to said duct, and the resilient means being attached to said abutment and gasket means so as to urge said gasket means away from said abutment.

4. Electrical apparatus comprising a heat generating current carrying conductor, an enclosure surrounding said conductor, a heat absorbing fluid in said enclosure, means in said enclosure for distributing said fluid around said conductor, heat transfer means having a fluid inlet externally connected to said enclosure, and a duct connecting a fluid outlet on said heat transfer means to the fluid distributing means in said enclosure, gasket means surrounding said duct, means on said duct resiliently urging said gasket means into fluid sealing contact with said fluid distributing means, the fluid distributing means comprising a hollow member having an opening in a wall thereof, said enclosure having a side panel thereof spaced from said wall and having a hole therein substantially aligned with said opening, said duct having an end portion passing through said hole and entering the opening in said wall, said duct having an abutment attached thereto between the member wall and enclosure side panel, said gasket means being located between said member wall and abutment and being movable axially along said duct, said resilient means contacting said abutment and gasket means and urging said gasket means away from said abutment into fluid sealing contact with said wall around the opening therein.

5. Apparatus as recited in claim 4 in which the resilient means comprises a spring.

6. Apparatus as recited in claim 4 in which the gasket means comprises a flexible element having an internal diameter less than the external diameter of said duct.

7. A transformer comprising a heat generating core and winding, an enclosure surrounding said core and winding, a heat absorbing fluid in said enclosure, heat transfer means having a high temperature fluid inlet externally connected to said enclosure, a plenum chamber in said enclosure comprising a hollow member that distributes said heat absorbing fluid through said core and winding, said hollow member having a fluid inlet opening in a wall thereof, said enclosure having a side panel thereof spaced from said wall and having a hole therein substantially aligned with said opening, fluid intake means connecting a low temperature fluid outlet on said heat transfer means to said plenum chamber, said fluid intake means comprising a duct having a portion thereof passing through the hole in said enclosure side panel and entering the opening in the hollow member wall, said duct having an abutment attached thereto between the hollow member wall and enclosure side panel, a flexible gasket surrounding said duct between said abutment and member wall, said gasket having an internal diameter less than the outer diameter of said duct but being axially movable along said duct, means between said abutment and gasket resiliently urging said gasket away from said abutment into fluid sealing contact with said member wall around the opening therein.

8. A transformer as recited in claim 7 in which a curved corona shield protects said abutment and last mentioned resilient means, the corona shield being movable along said duct with said gasket.

References Cited in the file of this patent

UNITED STATES PATENTS

| | | |
|---|---|---|
| 686,598 | Evans | Nov. 12, 1901 |
| 2,285,594 | Lingal | June 9, 1942 |
| 2,440,556 | Paluev | Apr. 27, 1948 |
| 2,470,800 | Ashton | May 24, 1949 |
| 2,517,470 | Erisman | Aug. 1, 1950 |
| 2,547,106 | Zachariassen | Apr. 3, 1951 |